United States Patent Office

3,056,830
Patented Oct. 2, 1962

3,056,830
PREPARATION OF ALKYL ESTERS OF SORBIC ACID
Sieds Koopal, Sittard, Ulrich Verstrijden and Willem Pesch, Geleen, and Johannes J. M. Deumens, Nuth, Netherlands, assignors to Stamicarbon N.V.
No Drawing. Filed May 7, 1962, Ser. No. 193,009
Claims priority, application Netherlands May 9, 1961
6 Claims. (Cl. 260—486)

The present invention relates to a process for the preparation of alkyl esters of sorbic acid.

It is known that by reacting ketene with crotonaldehyde in the presence of an inert dispersing agent and a bivalent metal salt of a fatty acid as catalyst, a polymeric reaction product is obtained from which sorbic acid can be prepared either by alkaline saponification and subsequent treatment with a strong acid, or by thermolysis. However, the sorbic acid produce is still impure and has to be purified by recrystallization or azeotropic distillation.

The ketene used in the above reaction is preferebaly prepared by thermally splitting acetic acid into ketene and water, preferably under reduced pressure. A drawback of this method of preparation is that the removal of water, acetic acid and acetic anhydride from the ketene obtained is a laborious and costly operation. Since acetic acid and acetic anhydride have an adverse effect on the reaction between ketene and crotonaldehyde, it is not possible to dispense with the purification.

According to another known process ketene is prepared by pyrolysis of acetone into the ketene, methane and smaller amounts of other products. However, in this process, too, the recovery of ketene and non-converted acetone from the pyrolysis mixture is a difficult and costly operation.

It is an object of the present invention to develop an improved procedure for preparing alkyl esters of sorbic acid.

Another object is to eliminate the costly purification steps normally required in the preparation of sorbic acid from ketene.

It has now been found that a satisfactory yield of very pure alkyl esters of sorbic acid can be obtained by reacting crotonaldehyde with ketene in the form of a gas mixture obtained by pyrolysis, of acetone, from which gas mixture the non-converted acetone either has not been removed or has been removed only partly, e.g., 0 to 85%. Subsequently the volatile components are removed from the resulting reaction mixture and there is added an alkanol and an esterifying catalyst to the remaining product, the resulting mixture is heated at a temperature, e.g. 100 to 160° C., that re-esterification and dehydration take place simultaneously, and finally the sorbic ester is separated from the resulting mixture by fractional distillation. The pure sorbic acid esters obtained in this way can be used as such, but they can also be saponified to alkali salts or to alkaline earth salts of sorbic acid, e.g. sodium sorbate, potassium sorbate, calcium sorbate, barium sorbate or magnesium sorbate or to very pure, free sorbic acid.

As the alkanol there can be used methanol, ethanol, isopropanol, n-propanol, n-butanol, tert. butanol, sec. butanol, n-pentanol and isoctanol.

The process according to the invention for the preparation of alkyl esters of sorbic acid by reacting crotonaldehyde with ketene (that has been prepared by pyrolysis of acetone), in the presence of an inert dispersing agent and a catalyst is characterized in that the gas mixture obtained during pyrolysis of acetone is introduced, either directly or after removal of a portion of the non-converted acetone, into the solution of crotonaldehyde in the dispersing agent. Then the volatile components are removed from the reaction mixture, the remaining product, together with an alkanol, is heated in the presence of an esterification catalyst, and finally the sorbic acid ester is separated from the ester mixture by fractional distillation.

Compared with the known process for the preparation of sorbic acid and esters thereof, the process according to the invention offers several advantages. In the first place, acetone, an easy-to-purify and easy-to-handle non-corrosive material, is used as starting product. Secondly, the ketene gas need not be subjected to a laborious and costly purification, but the gas mixture obtained by the pyrolysis can be directly introduced into the reactor in which the reaction with crotonaldehyde takes place, or if desired it suffices to insert a simple device for removing part of the acetone. Thirdly, all acids formed as by-products during the reaction, and also the fatty acid present in the catalyst in the form of its salt, are removed as esters in the final fractional distillation. Fourthly, the process yields sorbic acid in the form of an ester which can be readily purified by distillation, especially when an alkanol of low molecular weight, e.g. containing 1 to 3 carbon atoms, is used in the re-esterification.

To reduce formation of acetic acid and acetic anhydride as much as possible, the acetone used as starting product should have only a low water content, but it is not necessary to make the acetone completely anhydrous. As only part of the acetone employed is converted in the pyrolysis, for instance 15 to 25% of the amount supplied, the greater part of it is recovered during the process and can, if desired after purification, be returned to the pyrolysis unit in a nearly completely anhydrous form.

When the process according to the invention is carried out in such a way that the gas mixture obtained during pyrolysis is directly introduced into the reactor in which the reaction of ketene with crotonaldehyde takes place, the gas issuing from the pyrolysis furnace is preferably first cooled to a temperature just above the boiling point of acetone, for instance to a temperature of about 60° C. In one embodiment of the process, in which the gas mixture is first freed of part, e.g., 80% of the non-converted acetone, the gas mixture, after being cooled down to the above-mentioned temperature, is preferably passed through a water-cooled reflux cooler from which the condensed liquid flows into a collecting tank. It is further recommended that the liquid in this collecting tank be kept at its boiling temperature to prevent formation of conversion products of ketene, such as diketene. The amount of acetone removed from the gas mixture can be varied by controlling the flow rate of the gas, varying the area of the cooling surfaces, etc.; this amount may for instance be 50 to 75% of the total amount of acetone passed through. The recovered acetone can be continuously or discontinuously drained from the collecting tank and, as mentioned above, be returned to the pyrolysis furnace, either directly or after purification, for instance by distillation.

In a preferred method of carrying out the process the reaction of ketene with crotonaldehyde is carried out by introducing the ketene-containing gas mixture into a reactor which is, at least partly, filled with inert packing bodies, and in which is circulated a solution of crotonaldehyde in an inert dispersing agent, which solution also contains the catalyst. The dispersing agent to be used may be any one of the liquids normally employed for this reaction, such as aromatic, aliphatic and alicyclic hydrocarbons and derivatives thereof, for instance hexane, heptane, octane, benzene, toluene, xylene, cyclohexane, methylene chloride, chloroform, tetrachloromethane, chlorobenzene, and nitrobenzene. The catalysts used may also be any of the substances known as such, e.g. cadmium, butyrate, nickel stearate and cobalt-hexoate.

Especially preferred is the use of zinc salts of fatty acids such as zinc butyrate, zinc isovalerate, zinc hexoate, zinc sorbate and zinc stearate. It is advisable to carry out the reaction between ketene and crotonaldehyde at a temperature below the boiling point of acetone preferably at a temperature between 25 and 35° C. The catalyst is used in an amount of 0.1 to 5% of the crotonaldehyde.

Although it is possible to react the ketene with an equimolecular amount of crotonaldehyde, it is recommendable to provide for a permanent excess of crotonaldehyde, e.g. a 1 to 10% excess, and to prevent the reaction from proceeding beyond a degree of conversion of 75 to 90% with respect to the crotonaldehyde. Proper dimensioning of the reactor will then permit the ketene to be completely converted into the polyester.

It is surprising that in this process only a small portion of the acetone introduced together with the ketene is caused to react with the ketene by the action of the catalyst present, and consequently that the reaction between crotonaldehyde and ketene evidently proceeds at a considerably faster rate. It was found that, in addition to the polyester of $\beta$-hydroxy-, $\alpha,\beta$-dihydrosorbic acid, the polymer product contains only 1 to 2% of polyester of $\beta$-methyl-, $\beta$-hydroxy-butyric acid, which latter compound is known to be formed by the reaction between acetone and ketene.

The removal of acetone, unconverted crotonaldehyde, dispersing agent and other volatile impurities may be effected for instance by distillation under normal pressure and subsequent steam distillation. The latter operation is particularly suited for recovering the crotonaldehyde as completely as possible from the reaction product. However, other methods of distillation may also be applied. It is preferable not to remove all of the dispersing agent used, as otherwise the remaining product will become too viscous and, consequently, difficult to process. The recovered substances, e.g., acetone crotonaldehyde and dispersing agent may, if necessary after further purification, be returned to the preceding reaction stages.

To enable the polymer product left behind after removal of the volatile components to be converted into the sorbic acid ester, it is necessary to provide for conditions under which dehydration will take place. This may be achieved by carrying out the re-esterification at a higher temperature, for instance above 100° C., and preferably between 130 and 160° C. However, higher temperatures may also be employed. When using a lower alkanol the re-esterification and the dehydration must be carried out under pressure if high temperatures are employed. This pressure may be the autogenous pressure, but it is also possible to increase the pressure with the aid of an inert gas, e.g. nitrogen and argon.

The amount of alkanol added to the polymer product should at least be equal to the equimolecular amount calculated on the total amount of acids present in the polymer product in the form of polyesters, salts and free acids, if any. Preferably, however, an excess of alkanol is added which varies for instance from 5 to 15 mol. of alkanol per mol. of bound or free acid present in the polymer product. As previously indicated the alkanol used may be any of the substances belonging to this class of compounds, but lower molecular weight alkanols, especially ethanol, are preferred.

The catalyst to be added in the re-esterification may be any of the substances known as esterification catalysts, for instance compounds of low volatility, such as concentrated sulfuric acid, sulfonic acids, e.g. toluene sulfonic acid and benzene sulfonic acid and phosphorus pentoxide or volatile compounds, such as hydrochloric acid and boron trifluoride. In general, it is preferable to use concentrated sulfuric acid, which substance may for instance be added in an amount of 1 to 10% by weight of polyester. The other catalysts are used in similar proportions.

The recovery of the sorbic acid ester from the ester mixture is effected by fractional distillation preferably under reduced pressure and, if necessary, after previous removal of the esterification catalyst. The catalyst can be removed by washing with water or a dilute soda solution. The excess of the alkanol used and alkylesters of acetic acid, $\beta$-methyl-crotonic acid and the fatty acid of the previously added catalyst are separated as lower-boiling fractions and the sorbic acid ester as a higher-boiling fraction in the pure state.

The process according to the invention is particularly suited as a continuous process in which the sorbic acid ester is obtained in a good yield.

The invention will be further explained with reference to the following examples without being restricted thereto.

Unless otherwise indicated all parts and percentages are by weight.

*Example 1*

Acetone, previously heated to approximately 250–300° C., was passed at a constant rate through a quartz tube (length 80 cm., inner diameter 4 mm.), heated in a furnace at a temperature of about 680° C. In 4 hours a total amount of 440 grams (7.6 moles) of acetone was passed through. The pyrolysis gas issuing from the tube was first cooled to a temperature of about 56° C. and after that introduced into the base of a reflux cooler which was cooled to approximately 18° C. The liquid condensing in this cooler flowed into a round-bottom flask in which it was kept just boiling. An amount of 286 grams of unconverted acetone (65% of the total amount of acetone), was collected in this way. The gas mixture issuing from the cooler and fed to the reactor still contained 76 grams of unconverted acetone and 45 grams (1.08 mol.) of ketene beside other pyrolysis products. Consequently, at the degree of conversion obtained, namely 17.7%, the yield of ketene from acetone amounted to 80%.

The reactor in which the reaction between ketene and crotonaldehyde took place was a column (length 70 cm., inner diameter 2 cm.) filled with porcelain packing bodies, through which 120 grams of a solution of 78 grams (1.11 mol.) of crotonaldehyde and 0.8 of zinc isovalerate in 48 ml. of toluene were circulated at 35° C. Upon completion of the reaction, acetone, unconverted crotonaldehyde, the greater part of the toluene and other volatile components were expelled from the reaction mixture by distillation under normal pressure and subsequent steam distillation. There remained 110 grams of a product which upon analysis appeared to contain 101 grams of polyester of $\beta$-hydroxy-, $\alpha,\beta$-dihydrosorbic acid and 2 grams of polyester of $\beta$-methyl-, $\beta$-hydroxy-butyric acid. From the recovered amount of unconverted crotonaldehyde the yield of the reaction with ketene was 98 to 99%.

The above-mentioned product was then heated at 150° C. in an autoclave for one hour together with 300 grams (6.5 moles) of ethanol and 5 grams of 96% $H_2SO_4$. After that the ester mixture was fractionated at a pressure of 15 mm. Hg, yielding sorbic acid ethylester in the form of a fraction boiling at 70° C. and having a refractive index $N_D^{20}=1.4928$. The yield amounted to 118 grams, i.e. 93.5% with respect to the polyester employed and about 92% with respect to crotonaldehyde. The distillation residue still contained a few percent of unconverted polyester, which can be fed back to the reesterification stage.

70 g. (0.5 mol.) of the sorbic acid ethylester obtained were heated and stirred for ½ hour together with a solution of 20 grams (0.5 mole) of sodium hydroxide in 200 ml. of water, as a result of which a homogeneous solution was obtained. After cooling, this solution was acidified with concentrated hydrochloric acid causing sorbic acid to crystallize out. The latter substance was filtered off and dried. The weight of the sorbic acid was 54.9 grams which corresponds to a yield of 98.0% with respect to the sorbic acid ester employed. After recrystallization from a mixture of ethanol and water, the lightly colored product yielded a pure, white and odorless sorbic acid with a melting point of 134° C.

*Example 2*

An experiment was made with the same amount of reactants in the same apparatus and under the same reaction-conditions as described in Example 1, with the exception that the pyrolysis gas issuing from the quartz tube was fed, after being cooled to a temperature of about 56° C. directly into the reactor in which the reaction between ketene and crotonaldehyde took place.

The reaction product was worked up in the same way as described in Example 1 and yielded 115 grams of a product which upon analysis appeared to contain 98 grams of polyester of $\beta$-hydroxy-, $\alpha,\beta$-dihydrosorbic acid and 5 grams of polyester of $\beta$-menthyl-, $\beta$-hydroxy-butyric acid. From the recovered amount of unconverted crotonaldehyde the yield of the reaction with ketene was 96%.

The above mentioned product was then treated with ethanol and $H_2SO_4$ in the same way as described in Example 1, yielding sorbic acid ethylester in an amount of 112 grams, i.e. about 90% with respect to crotonaldehyde.

What is claimed is:

1. In a process for the preparation of alkyl esters of sorbic acid by reaction of ketene, prepared by pyrolysis of acetone, with crotonaldehyde in the presence of an inert liquid dispersing agent and a catalyst, the improvement comprising introducing the gas mixture obtained during pyrolysis, after removal of not over 85% of the non-converted acetone, into the solution of crotonaldehyde in the dispersing agent, removing the volatile components from the reaction mixture, heating the remaining polymer product together with an alkanol in the presence of an esterification catalyst, and separating the sorbic acid ester from the mixture by fractional distillation.

2. A process according to claim 1, wherein the removal of the volatile components from the reaction mixture after the reaction with crotonaldehyde is effected by distillation under normal pressure and subsequent steam distillation.

3. Process according to claim 1 wherein the heating of the remaining polymer product with an alkanol is effected at a temperature between 130 and 160° C.

4. A process according to claim 3 wherein the alkanol is present in an amount of 5 to 15 moles per mole of bound and free acid present in the polymer product.

5. A process according to claim 4, wherein the alkanol is ethanol.

6. A process according to claim 1 wherein the alkanol is a lower alkanol and is present in an amount of 5 to 15 moles per mole of bound and free acid present in the polymer product.

No references cited.